(12) United States Patent
Potter

(10) Patent No.: US 8,750,740 B2
(45) Date of Patent: Jun. 10, 2014

(54) AUTO-POSITIONING USER INTERFACE BASED ON USER ACTIVITY

(75) Inventor: Scott Potter, Welwyn Garden City (GB)

(73) Assignee: Xerox Corporation, Norwalk, CT (US)

( * ) Notice: Subject to any disclaimer, the term of this patent is extended or adjusted under 35 U.S.C. 154(b) by 617 days.

(21) Appl. No.: 13/012,019

(22) Filed: Jan. 24, 2011

(65) Prior Publication Data

US 2012/0188589 A1 Jul. 26, 2012

(51) Int. Cl.
*G06F 3/12* (2006.01)

(52) U.S. Cl.
USPC ............. 399/81; 358/1.1; 358/1.15; 399/107; 399/126

(58) Field of Classification Search
USPC ..................... 358/1.1, 1.15; 399/81
See application file for complete search history.

(56) References Cited

U.S. PATENT DOCUMENTS

| 5,488,453 | A  | * | 1/1996 | Labudde et al. | ................... | 399/1 |
| 7,006,015 | B2 | * | 2/2006 | England | ......................... | 341/22 |
| 7,386,245 | B2 | * | 6/2008 | Mitsuhashi et al. | ............ | 399/81 |
| 7,783,221 | B2 | * | 8/2010 | Akiyama et al. | ................ | 399/81 |

* cited by examiner

*Primary Examiner* — Mark Zimmerman
*Assistant Examiner* — Lawrence Wills
(74) *Attorney, Agent, or Firm* — Fay Sharpe LLP

(57) ABSTRACT

A device including a selectively positionable user interface that automatically repositions based on a user action, such as an office machine equipped with a user interface that is configured to tilt from a first position to a second position when a document handler is moved from an open position exposing the glass platen to a closed position, and then to return to the first position when the document handler is moved from the closed position to the open position.

8 Claims, 4 Drawing Sheets

AUTO-POSITIONING USER INTERFACE BASED ON USER ACTIVITY

BACKGROUND

Many desktop and office machines, such as copiers, printers, scanners, etc., have a local user interface (LUI) that is set at a fixed and shallow angle of presentation to the user. Accordingly, the user typically must optimally position themselves in the same place in order to view the LUI. On many machines, the LUI is located on a top surface of the machine adjacent a platen glass such that the user must position themselves with their heads generally directly over (above) the LUI. This can be both restrictive and uncomfortable for many users. Further, such machines often include a document handler or other movable panel designed to be opened and closed to access the platen glass. For a given LUI, this often requires a user to move between different positions for viewing the LUI when the document handler is moved between its respective positions. Such prior art LUI's present obstacles to use by people with disabilities, such as those in wheelchairs.

BRIEF DESCRIPTION

The present disclosure sets forth a selectively positionable user in interface that automatically repositions based on a user action. For example, an office machine equipped with an LUI in accordance with the disclosure may be configured to tilt the LUI, or a display associated therewith, when a document handler is moved from an open position exposing the glass platen to a closed position, and then to recline the LUI and/or display associated therewith when the document handler is moved from the closed position to the open position thus facilitating viewing and/or interaction with the LUI in both positions of the document handler.

In accordance with an aspect of the disclosure, a device comprises a document processing component, a selectively positionable user interface for enabling a user to input and/or receive information relating to operation of the printing device, the user interface moveable between a first position associated with a first user activity to a second position associated with a second user activity, and a repositioning mechanism configured to reposition the user interface between the first and second positions based on user interaction with the printer device corresponding to at least one of the first and second user activities.

The device can further comprise at least one moveable component moveable between first and second positions, the repositioning mechanism configured to reposition the user interface in response to movement of the moveable component. The moveable component can include at least one of a paper tray access door, a document handler, or other access panel. The repositioning mechanism can include a mechanical linkage between the user interface and the moveable component, the mechanical linkage operative to effect repositioning of the user interface upon movement of the moveable component. The user interface can be generally parallel with a surface of the printing device in the first position, and can be inclined relative to said surface when in the second position. The user interface can include a display and a user input device, and the display can be moveable to selectively conceal or reveal the user input device.

The device can further include a document handler on an upper surface thereof, wherein the first user activity includes inserting or removing documents from the document handler and the second user activity includes opening the document handler. The first position of the user interface can be inclined relative to the top surface of the printer surface for viewing from a position adjacent the printing device, and the second position of the user interface can be reclined relative to the first position for viewing from a position generally above the device. The device can include a sensor for sensing a user activity, said sensor configured to activate the repositioning mechanism to reposition the user interface when a prescribed activity is detected.

In accordance with another aspect, a method of positioning a user interface of a device in an optimized viewing position comprises orienting the user interface in a first position corresponding to a first user activity, detecting a second user activity different than the first user activity, and reorienting the user interface to a second position with a repositioning mechanism in response to detecting the second user activity.

The detecting step can include sensing movement of a movable component of the printer device with a sensor. The step of reorienting the user interface can include moving the user interface from a position generally parallel with a surface of the device in the first position, to a second position inclined relative to said surface. The method can also include reorienting the user interface to the first position when the second user activity is no longer detected. The method may further include reorienting the user interface to the first position when the first user activity is detected.

In accordance with another aspect, a printing device comprises a printing component, a selectively positionable user interface for enabling a user to input and/or receive information relating to operation of the printing device, the user interface moveable between a first position associated with a first user activity to a second position associated with a second user activity, a user moveable component moveable by a user between first and second positions during use of the printing device to perform a function related to operation of the printing device, and a mechanical linkage between the user moveable component and the user interface. Movement of the user moveable component between respective first and second positions results in movement of the user interface between its first and second position.

The moveable components can include a movable panel adapted to provide selective access to a part of the printing device. The moveable panel can include at least one of a document handler and a paper tray access cover.

DETAILED DESCRIPTION

Figure 1:
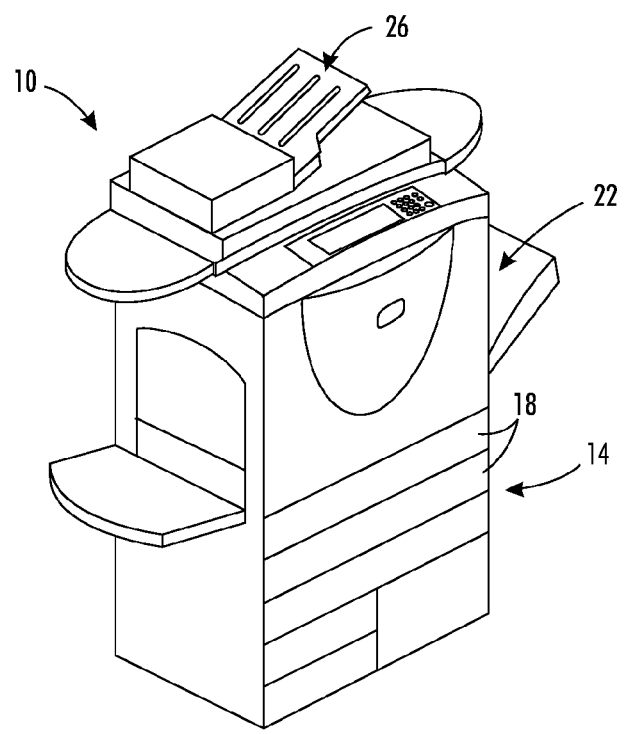
FIG. 1 is a perspective view of a prior art office machine in the form of a copier.
Figure 2:
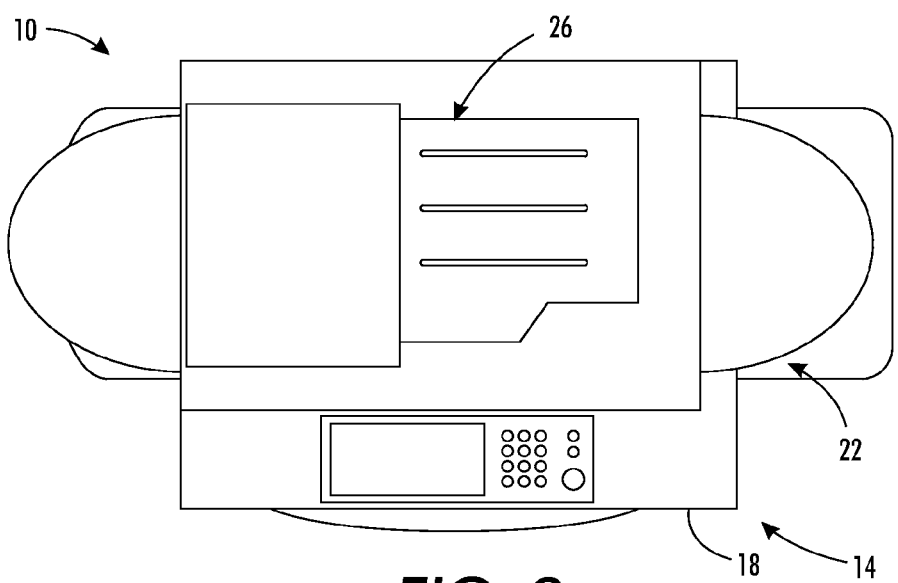
FIG. 2 is an enlarged perspective view of the prior art office machine of FIG. 1.

Referring now to the drawings in detail and initially to FIGS. 1 and 2, a conventional office machine or device in the form of a copier is generally identified by reference numeral 10. As will be appreciated, the conventional copier includes a base portion 14 having one or more paper drawers or trays 18 for storing various sizes of paper for use by the copier 10. Within the base portion 14, one or more printing components and/or other document processing components are provided for carrying out document processing functions of the copier machine. The base portion 14 may also include scanning components for scanning documents, collating components and/or binding components. Attached to an upper surface of the copier 10 is a document handler 22 which may include one or more document advancing mechanisms for advancing individual sheets across a glass platen 26 for scanning thereof. A LUI 30 is installed on the top surface of the base portion 14 of the copier 10 and may include a display, which can be a touch screen display, and/or can include one or more buttons or a keyboard, etc.

During operation of this conventional copier, a user typically walks up to the machine and accesses the LUI in order to make any changes to settings of the machine and/or select a number of copies to be made, etc. During such initial setup, the user typically will position themselves directly above the LUI for optimal viewing. As noted previously, this requires the user to position themselves in the same position each time they use the device regardless of what action they may be performing (changing settings, loading the document handler, removing paper jams including following instructions to clear the paper jam displayed on the LUI).

Figure 3:
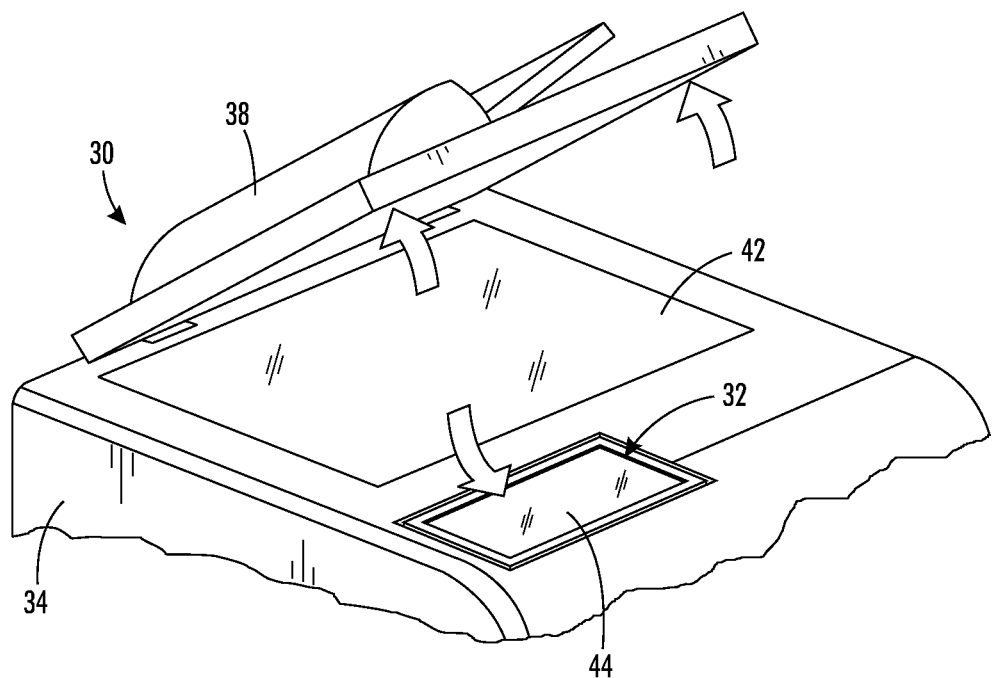
FIG. 3 is a perspective view of an exemplary office machine including a selectively repositionable user interface in accordance with the disclosure.
Figure 4:
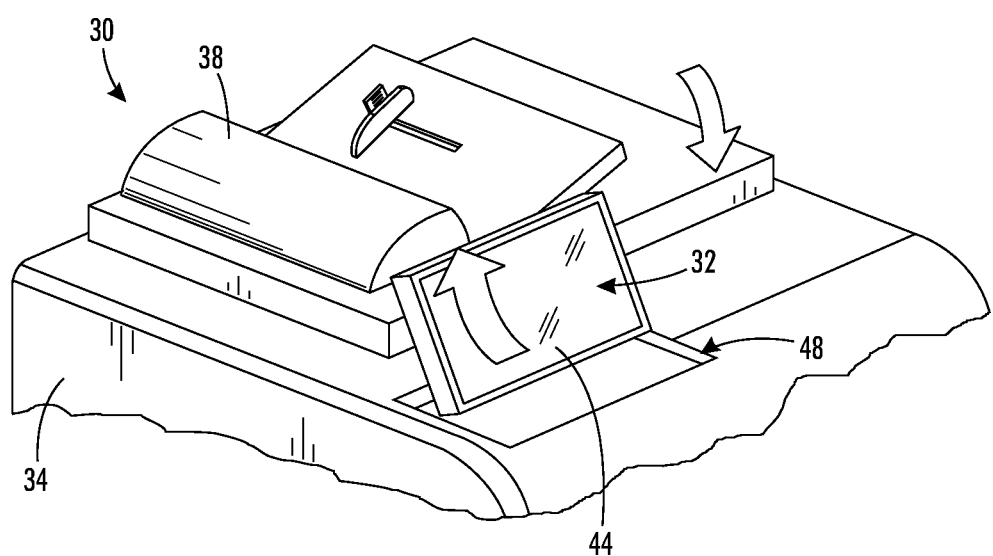
FIG. 4 is another perspective view of the exemplary office machine of FIG. 3.

Turning to FIGS. 3 and 4, a device in accordance with the present disclosure including a selectively positionable user interface 32 is illustrated and referred to generally by reference numeral 30. As will be appreciated, the device can be any type of office and/or desktop device including, for example, a copier, a printer, a fax machine, a scanner, etc. In the illustrated embodiment, the device is a desktop copy machine including a base portion 34 containing scanning and/or printing components and a document handler that is movable between an open position (FIG. 3) exposing a platen 42 and a closed position (FIG. 4) corresponding to a scanning and/or printing position.

The device 30 includes a selectively positionable user interface 32 for enabling a user to input and/or receive information relating to operation of the device 30. The user interface 32 in the illustrated embodiment generally includes a display 44, which may be a touch screen display, and optionally includes a physical user input device in the form of a keyboard 48. The keyboard 48 is concealed below the display 44 when the display 44 is in the position shown in FIG. 3. When the document handler 38 is closed and the display 44 is moved to the position shown in FIG. 4, the keyboard 48 is revealed for use by a user.

A repositioning mechanism, although not shown in FIGS. 3 and 4, is provided for automatically repositioning the user interface 32 between the first position shown in FIG. 3 and the second position shown in FIG. 4 based on user interaction with the device 30. Movement of the selectively positionable user interface 32 between its first and second positions can be predicated upon user interaction with the device corresponding to one of a first and second user activity. By way of example, a first user activity may be the opening of the document handler 38 for positioning a document on the glass platen 42 for scanning or other processing. When a user opens the document handler 38, the display 44 can be configured to orient itself to the position shown in FIG. 3 such that the user, who will typically be located in close proximity to the device for placing documents on the platen 42 may easily view the display from above. Upon initiation of a second user activity, for example, closing the document handler 38 (e.g. moving the document handler to the position of FIG. 4), the display 44 can be configured to incline relative to its position shown in FIG. 3 to the position shown in FIG. 4. This tilted position allows a user to easily view the display from a position slightly spaced from the device 30. By tilting the display 44 to the position of FIG. 4, the user is provided with a more direct view of the display that is most likely closer to an optimum viewing angle for the user based on the user's new position.

Another advantage of tilting the screen between the positions shown in FIGS. 3 and 4, is that the additional user input, the keyboard, is exposed and made available for use by the user. This occurs automatically and thus presents the keyboard 48 to the user without the user even needing to be aware of the existence of the keyboard under the display 44.

Figure 5:
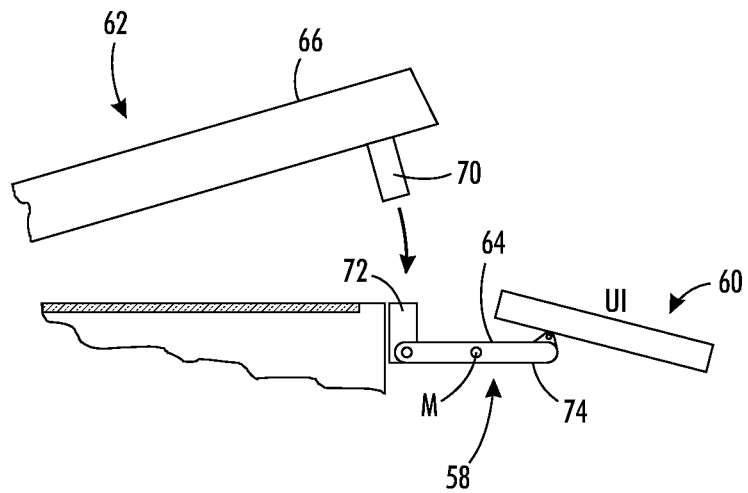
FIG. 5 is a side view of an exemplary repositioning mechanism in accordance with the disclosure.
Figure 6:
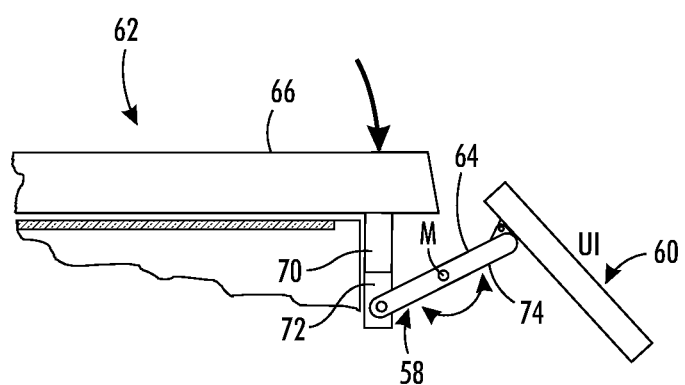
FIG. 6 is another side view of the repositioning mechanism of FIG. 5.

Turning to FIGS. 5 and 6, an exemplary repositioning mechanism 58 for repositioning an exemplary user interface 60 of an office machine 62 is illustrated. The repositioning mechanism 58 generally includes a mechanical linkage 64 for linking movement of a moveable member or panel, such as document handler 66, with movement (repositioning) of the user interface 60.

For example, movement of the document handler 66 between open and closed positions can effect automatic repositioning of the user interface 60. To effect such movement, the document handler includes a protrusion 70 adapted to impinge on a plunger 72 mounted for reciprocating movement relative to a base of the office machine 62. The protrusion 70 is configured to displace the plunger 72 between the position shown in FIG. 5 and the position shown in FIG. 6 when the document handler is moved from an open position to a closed position. The plunger 72 in turn is adapted to displace an end of a linkage bar 74 that is pivotally secured at its midpoint M thereby rotating said linkage bar 74. Meanwhile, user interface 60 is pivotally secured to an opposite end of the linkage bar 74 such that as the linkage bar 74 is rotated in a first direction, the user interface is rotated in an opposite direction resulting in the user interface being tilted relative to its starting position.

As will be appreciated, the user interface 60 is configured to be in a relatively flat or reclined state when the document handler 66 is open, and to automatically reposition to a relatively inclined position when the document handler 66 is closed. This provides a user moving between two user positions associated with two user activities, for example loading a document on a platen and/or loading documents in the document handler, a more optimal viewing angle.

Figure 7:
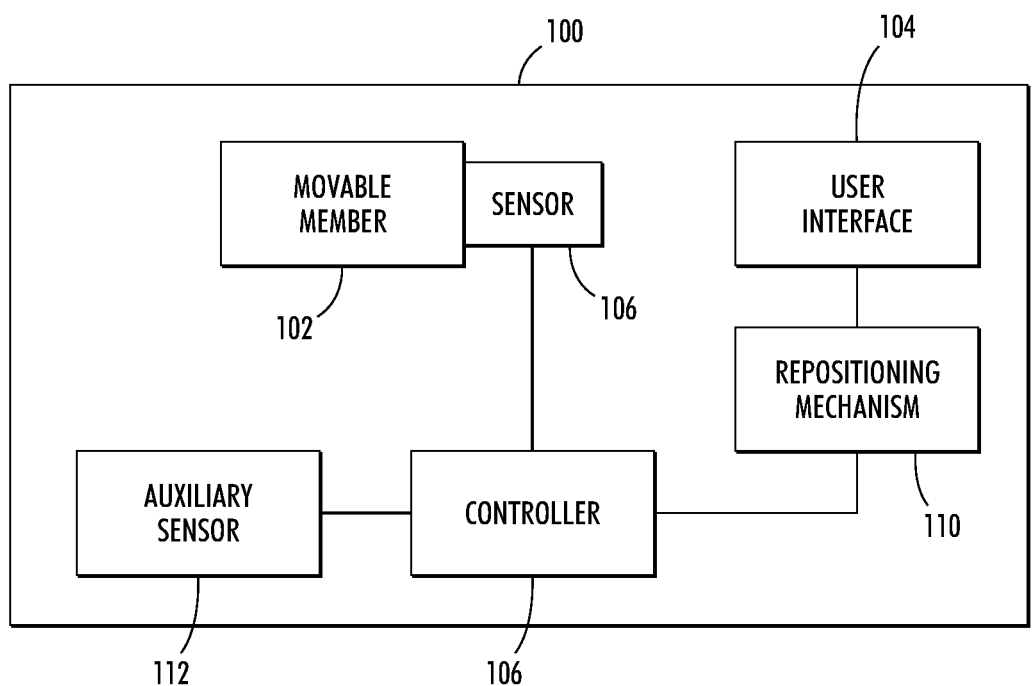
FIG. 7 is a schematic block diagram of an exemplary device including an electrically actuated repositioning mechanism.

Turning to FIG. 7, a schematic block diagram illustrates a device having a repositioning mechanism for repositioning a user interface in response to user activity. The device 100 includes a movable member 102 (e.g., access panel, document handler etc.) and a user interface 104. A sensor 106 associated with the movable member 102 is adapted to sense movement and/or a position of the movable member 102, such as opening of an access panel, etc. A controller 108 receives a signal from the sensor 106 corresponding to sensed activity and in response thereto directs a repositioning mechanism 110 to reposition the user interface 104. As will be appreciated, the repositioning mechanism can be electrically actuated. For example, a servo motor, solenoids, or the like can be adapted to reposition the user interface 104.

The illustrated device 100 further includes an auxiliary sensor 112 that can be adapted to sense a position of a user. For example, the auxiliary sensor 112 can include an electric eye or light sensor that can sense when a user is proximal to the sensor. By using such information, the device can be configured to automatically reposition the user interface based on the position of the user. This can include providing multiple sensors corresponding to various user positions such as, for example, standing in front of the device, leaning over the device, etc.

In another embodiment, the auxiliary sensor 112 can include a camera utilizing facial recognition technology to detect a user's face and orient the user interface towards the user's face.

It will now be appreciated that aspects of the disclosure can be applied to automatically reposition the user interface based on a wide variety of user activities. For example, many copiers include multiple paper storage trays and access doors for, among other things, clearing paper jams that may occur during operation of the device. It is common to provide instructions on a display of the user interface for loading paper, clearing paper jams, replacing toner cartridges, etc. Most of these tasks are performed by a user when the user is not in view of a conventionally located LUI. That is, access to paper trays is typically provided below a top surface of the copier where the LUI is typically located. Similarly, clearing paper jams often requires a user to open one or more access panels that are distributed around the various sides and/or top of the copy machine in order to remove jammed sheets of paper. Also, replacing toner cartridges may require a user to open an access door that is not in the vicinity of the user interface. While providing instructions for carrying out these tasks on the user interface is helpful since a user cannot generally see the user interface while performing these tasks, the user must go back and forth between the user interface and the access panel or paper tray or whatever component of the device that must be manipulated.

In accordance with the present disclosure, the selectively positionable user interface can be configured to automatically reposition based upon a user accessing an access panel of the device. For example, if in order to clear a paper jam a user is instructed to open a panel on the front of the copier, upon opening that panel the selectively positionable user interface can be configured to orient itself towards a position most likely corresponding to an optimal viewing angle for a user opening said access panel, and then additional instructions can be provided on a display of the user interface. In many cases, this may include tilting a display of the LUI downward towards the floor such that a user kneeling in front of the machine would be able to view the instructions for clearing the paper jam while remaining in the kneeling position. If another step in the process of clearing the paper jam is then required, upon closing of the first access panel the selectively positionable user interface can be configured to then orient itself in a position to be viewed by a user accessing or opening the next access panel required in the paper jam clearing sequence.

To effect positioning of the user interface, a mechanical linkage between a component of the device and the user interface can be operative to effect repositioning of the user interface upon movement of the component of the device. More typically, however, the user interface may be pivotally and/or slidably mounted to a surface of the copier and moved between various positions by an electric motor or other electric actuator. A control circuit including a controller and one or more sensors for sensing user activity can be adapted to control the electric actuator to selectively position the user interface based on a detected user activity. As used herein, user activity can include not only direct user interaction with the device, but also a user being positioned in a certain proximity to the device or portion thereof.

As will be appreciated by selectively automatically repositioning the user interface based upon user activity, the usability and accessibility of the device is enhanced. Moreover, the device is also more ergonomic in that certain tasks can be performed without requiring a user to switch positions for viewing the user interface.

It will be appreciated that aspects of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A device comprising:
a document processing component;
a selectively positionable user interface for enabling a user to input and/or receive information relating to operation of the printing device, the user interface moveable between a first position associated with a first user activity to a second position associated with a second user activity;
a repositioning mechanism configured to reposition the user interface between the first and second positions based on user interaction with the printer device corresponding to at least one of the first and second user activities; and
a document handler on an upper surface of the device;
wherein the first user activity includes inserting or removing documents from the document handler and the second user activity includes opening the document handler.

2. A device as set forth in claim 1, further comprising at least one movable component moveable between first and second positions, wherein the repositioning mechanism repositions the user interface in response to movement of the movable component.

3. A device as set forth in claim 2, wherein the movable component includes at least one of a document handler, a paper tray access door, or other access panel.

4. A device as set forth in claim 2, wherein the repositioning mechanism includes a mechanical linkage between the user interface and the movable component, the mechanical linkage operative to effect repositioning of the user interface upon movement of the movable component.

5. A device as set forth in claim 1, wherein the user interface is generally parallel with a surface of the printing device in the first position, and is inclined relative to said surface when in the second position.

6. A device as set forth in claim 1, wherein the user interface includes a display and a user input device, and wherein the display is moveable to selectively conceal or reveal the user input device.

7. A device as set forth in claim 1, wherein the first position of the user interface is inclined relative to the top surface of the printer surface for viewing from a position adjacent the printing device, and the second position of the user interface is reclined relative to the first position for viewing from a position generally above the printing device.

8. A device as set forth in claim 1, further comprising a sensor for sensing a user activity, said sensor configured to activate the repositioning mechanism to reposition the user interface when a prescribed activity is detected.

* * * * *